US012372218B2

(12) United States Patent
Smith et al.

(10) Patent No.: US 12,372,218 B2
(45) Date of Patent: Jul. 29, 2025

(54) VEHICLE LIGHTING SYSTEM USING LIGHT CHANNELS

(71) Applicant: WHELEN ENGINEERING COMPANY, INC., Chester, CT (US)

(72) Inventors: Todd Smith, Deep River, CT (US); Sean Brown, Berlin, CT (US); Gavin Shepherdson, Stonington, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 0 days.

(21) Appl. No.: 18/648,060

(22) Filed: Apr. 26, 2024

(65) Prior Publication Data

US 2024/0360976 A1    Oct. 31, 2024

Related U.S. Application Data

(60) Provisional application No. 63/462,308, filed on Apr. 27, 2023.

(51) Int. Cl.
| | | |
|---|---|---|
| *F21S 43/31* | (2018.01) | |
| *B60Q 1/52* | (2006.01) | |
| *F21S 43/14* | (2018.01) | |
| *F21S 43/20* | (2018.01) | |
| *F21S 43/33* | (2018.01) | |
| *F21Y 113/00* | (2016.01) | |
| *F21Y 115/10* | (2016.01) | |

(52) U.S. Cl.
CPC ............... *F21S 43/31* (2018.01); *B60Q 1/52* (2013.01); *F21S 43/14* (2018.01); *F21S 43/281* (2024.05); *F21S 43/33* (2018.01); *B60Q 2400/20* (2013.01); *F21Y 2113/00* (2013.01); *F21Y 2115/10* (2016.08)

(58) Field of Classification Search
CPC ....... F21S 43/31; F21S 43/14; F21Y 2113/00; F21Y 2115/10
See application file for complete search history.

(56) References Cited

U.S. PATENT DOCUMENTS 8,807,772 B2 * 8/2014 Kim ................... G02F 1/133615
362/97.3
8,827,478 B2 * 9/2014 Kuromizu ................ G02B 3/08
362/97.3
9,726,342 B2 * 8/2017 Lee ................... G02F 1/133603
(Continued)

FOREIGN PATENT DOCUMENTS

CN        216844504          6/2022
WO    WO-2019058137 A1 *   3/2019    ......... G02B 19/0066

OTHER PUBLICATIONS

International Search Report and Written Opinion issued in PCT Application No. PCT/US2024/026588, dated Jul. 2, 2024.

*Primary Examiner* — Christopher E Dunay
(74) *Attorney, Agent, or Firm* — HOGAN LOVELLS US LLP

(57) ABSTRACT

A lightbar with additional periphery lights for further functionality. The periphery lights can be operated through LEDs positioned behind the primary emergency lights of the lightbar. The LEDs can transmit light through a light transmissive material to the periphery. These periphery lights can be operated independently of the primary emergency lights to provide identification during non-emergency situations or additional information for coordinating emergency response.

12 Claims, 14 Drawing Sheets

(56) References Cited

U.S. PATENT DOCUMENTS

| | | |
|---|---|---|
| 2005/0099317 A1 | 5/2005 | Pederson |
| 2008/0297020 A1 | 12/2008 | Wanninger |
| 2010/0165620 A1* | 7/2010 | Marson ............... F21V 7/24 |
| | | 362/235 |
| 2013/0094209 A1 | 4/2013 | Yu |
| 2013/0114300 A1* | 5/2013 | Lee ............... G02B 6/0038 |
| | | 362/619 |
| 2015/0330592 A1 | 11/2015 | Olson |
| 2017/0278439 A1 | 9/2017 | Wang |
| 2020/0005634 A1 | 1/2020 | Shuff |
| 2020/0332977 A1 | 10/2020 | Miedler |
| 2021/0172579 A1 | 6/2021 | Tsuchiya |
| 2021/0307213 A1* | 9/2021 | Kim ............... H05K 7/20954 |

* cited by examiner

VEHICLE LIGHTING SYSTEM USING LIGHT CHANNELS

CROSS REFERENCE TO RELATED APPLICATIONS

This application claims priority to U.S. Provisional Application No. 63/462,308, filed Apr. 27, 2023, the contents of which are hereby incorporated by reference in their entirety.

FIELD OF THE INVENTION

This invention relates in general to lighting systems for vehicles, and in particular to lighting systems incorporating light channel systems to controllably transmit light, and more particularly to emergency lighting systems incorporating materials that channel light from a light source to an emitting surface through internal reflection to provide cruise, accent, and peripheral lighting.

BACKGROUND OF THE INVENTION

Emergency vehicles traditionally use a variety of lighting elements such as lightbars to provide both indication and warning when performing emergency functions. Typically, these lightbars are turned off during non-emergency vehicle operation and turned on during emergency operations to produce various patterns and colors according to the type of emergency vehicle the lightbar is associated with.

Emergency vehicle lightbars are typically made with series of light emitting diode (LED) lights and reflectors to generate bright visual signals and to alert people in the area of the existence of an emergency condition. These lights are unused during non-emergency conditions and often cannot be used for any other function due to concerns with creating confusion as to whether the vehicle is responding to an emergency situation. Because of this, these lights cannot be used to alert people to the presence of an emergency vehicle that may need to respond to an emergency during periods of limited visibility, and based on their configuration, emergency vehicles are usually indistinguishable from vehicle to vehicle. Moreover, additional lighting devices on emergency vehicles are usually devoted to particular functions, such as providing spot lighting or flood lighting to illuminate a scene.

Additionally, at emergencies with multiple emergency response vehicles, the activated lightbars can result in a confusing scene of lights. In these situations, it can be difficult to determine which vehicle is coordinating the emergency response, especially in situations with limited visibility where vehicle markings may not be readily apparent. Because of this, there is a need in the art for emergency vehicle lighting systems, including for use with lightbars, that have lighting options outside of the primarily emergency signaling LED setup.

SUMMARY OF THE INVENTION

The present invention is directed to a system and method for providing a light channel system to selectively transmit light from a light source to a desired light output location different from the light source location, while minimizing the area required to transmit the light. The light channel system may include one or more light sources, a controller to selectively control the light sources, one or more light channel components to direct and transmit light from the one or more light sources, and one or more housings or mounting components. Each light channel component may channel light from one more light sources to one or more desired light output locations. For example, the light output locations can occur at an emitting surface of the light channel components. The light channel component may transmit the light using total internal reflection and may be formed of a light transmissive material. The light channel component may be formed from a clear, solid material or may be formed as a component with a hollow center and reflective internal surfaces. For example, the light channel component may be formed from an optical lens material made from a transparent material, such as acrylic, silicone, clear plastic, polycarbonate, glass, or fiber optic material. The light channel component may be configured as a light pipe or light guide and can be of different shapes and cross-sections.

The light channel may have a source end and an emitting surface, with the source end positioned in proximity to a light source such that light enters the light channel. The light from the source is then propagated within the light channel, such as by internal reflection, and exits the light channel at an emitting face or surface. The emitting surface may be smooth, such that the light exits in a uniform manner. Alternatively, the emitting surface may be patterned or have an optical element positioned in front of it, such that the light emits in a desired pattern. The light channel system may include a light source, light channel, housing, and controller. The light channel system may be included as a self-contained module, comprising the light source, housing or support structure, and light channel. The light channel system may also be included as a component along with another light source, or in conjunction with a light head for an emergency vehicle light bar. For example, the light channel system may be included as a component with another light source, such as a light bar, flood light, scene light, or beacon, such that the light channel system acts as a peripheral or accessory lighting element.

When used with a lightbar, the light channel system can transmit light from at least one light source to a top periphery of the lightbar, a bottom periphery of a lightbar, the sides of the light bar, and/or selective light emitting locations on the lightbar. When used with a lightbar, the light source for the light channel system may be a peripheral LED, separate from the LEDs or other light sources included in the lightheads making up the lightbar. Alternatively, the light channel system may use the LEDs or light sources in the lightheads as the light source. Multiple source LEDs can be used for the light channel system, with different LEDs acting as the source light for different light transmissive materials making up different light channels. This allows the system to selectively output different light at different output locations.

The system and method disclosed herein may also include a lightbar with front and back emergency warning sections with LEDs and reflective enclosures. The lightbar can also include at least one peripheral LED and light transmissive material making up a lighting channel. The light transmissive material can be in visual communication with at least one source LED, the front periphery, and the back periphery of the lightbar.

The system and method may also include a light splitter. With the light splitter, the light channel source LEDs can be split to transmit to the front periphery and the back periphery. Light can be emitted from the source LEDs to the splitter, and then independently through the light transmissive material making up one or more light channels to the different selected light emitting locations.

BRIEF DESCRIPTION OF DRAWINGS

The present technology will be better understood on reading the following detailed description of non-limiting embodiments thereof, and on examining the accompanying drawings in which.

DETAILED DESCRIPTION OF THE INVENTION

Figure 1A:
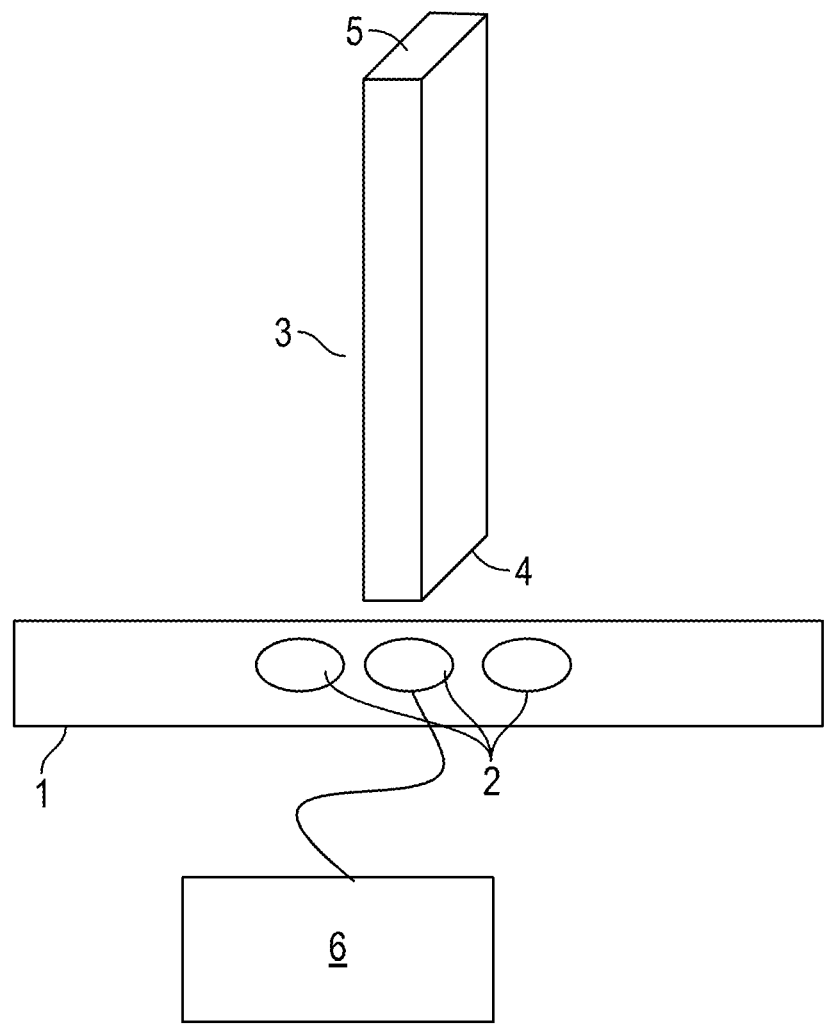
FIG. 1A is an illustration of a lighting channel system including light sources and a light channel component.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The invention, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment," "an embodiment," "certain embodiments," or "other embodiments" of the present invention are not intended to be interpreted as excluding the existence of additional embodiments that also incorporate the recited features. Furthermore, reference to terms such as "above," "below," "upper," "lower," "side," "front," "back," or other terms regarding orientation are made with reference to the illustrated embodiments and are not intended to be limiting or exclude other orientations.

FIG. 1A is an illustration of a lighting channel system that can be used as either a standalone lighting element or combined with other lighting elements in an overall lighting system. As shown, the lighting channel system may include a base 1, on which one or more light sources 2 are included. The light sources 2 may be fixed to the base 1, or may be removably attached to the base. In addition, light sources 2 may be movably attached to the base, such that its position on the base can be adjusted. The light sources may be, for example, one or more LEDs or any other light source. Moreover, the light sources 2 may emit visible light, infrared light, ultraviolet light, or light of any other wavelength. A light channel component 3 is positioned above the light sources 2. The light channel component has an incident surface 4, which receives light from one or more light sources such that light enters the light channel component 3. The light channel component 3 further has an emitting surface 5, from which light exits the light channel component 3. Light received at the incident surface 4 is transmitted through the light channel component 3, such as by total internal reflection, until it exits at the emitting surface 5. The light channel component 3 may be fixed to the base 1, or may be attached to the base 1 or another component with support structures. The light channel component 3 may be of any desired shape and may be formed of a rigid or flexible material, such as plastic, acrylic, silicone, polycarbonate, glass, or other transmissive material. The light channel component 3 may be solid or may be hollow and have reflective internal surfaces. Further, the light channel may be positioned above one of the light sources, such that light from only one of the light sources enters the incident surface of the light channel. The light channel may also be oriented such that light from a plurality of light sources enters the incident surface of the light channel and is emitted from the emitting surface. Moreover, a plurality of light channels may be included, with each light channel receiving light from one or more light sources.

As shown in FIG. 1A, a controller 6 may be included to control the one or more light sources 2. The controller may include at least one central processing unit (CPU) (e.g., processor) and memory coupled to the CPU, and a pulse-width modulation (PWM) driver. The CPU and the memory may be part of a microcontroller. The memory may store selected programming for the light channel system, which can be executed by the processor to produce the desired light outputs, including light color, intensity, and patterns. This programming can be done remotely by connecting the light channel system to a network, or can be done locally by connecting the device directly to a programming computer. The controller may be a dedicated controller for the light sources 2, or it could be a main controller for a larger lighting system. In addition, the controller may be connected to the base 1, or may be remote from the base and connected via wired or wireless connection to drivers for the light sources to control operation thereof. The light channel system may further include, as part of the controller 6, an interface with selectable inputs for a user to program and adjust the light output of the system. The interface may include, for example, buttons, dials, a touchscreen, switches, or other inputs for a user to select and change programming of the light output. A display may also be included in the interface. In addition, the light channel system may be a programmable unit, with a memory and processor included therein.

Figure 1B:
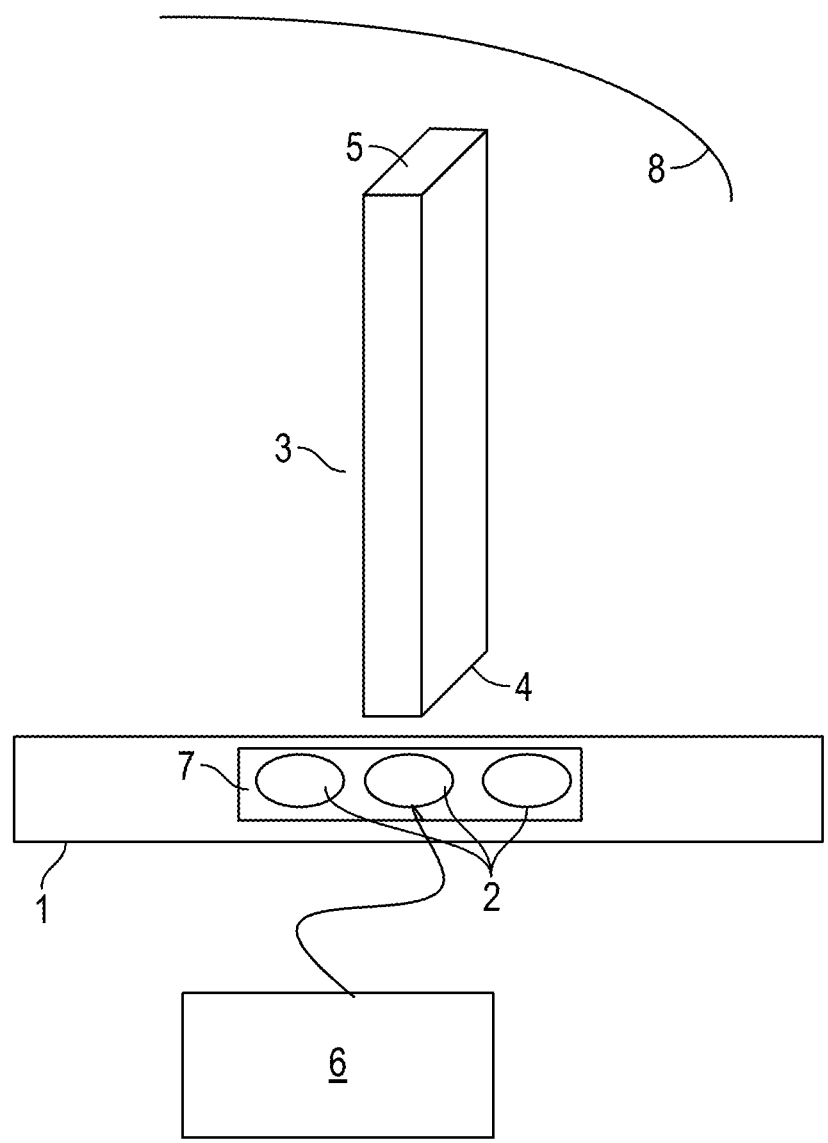
FIG. 1B is an illustration of a lighting channel system that further includes a reflector to receive light from the emitting surface of the light channel component.

FIG. 1B illustrates a light channel system that further includes a reflector 8, such that light channeled from the light sources 2 through the light channel component 3 can exit from the emitting surface 5 near the reflector 8. In particular, the light channel component 3 may be positioned with respect to the reflector 8 such that light exits from the emitting surface 5 at the focal point of the reflector 8. Light channel systems may also include combinations of light channels that transmit light to reflectors and light channels that transmit light to the exterior of the system. As shown in FIG. 1B, the light sources 2 may be LEDs included on a printed circuit board (PCB) 7 attached to the base 1. The reflector 8 may act as a main light source, and additional light channels could be added with light incident from the same LED light sources or additional light sources to provide peripheral or accent lighting. Moreover, the light channel may be positioned above one of the light sources, such that light from only one of the light sources enters the incident surface of the light channel and is emitted near the reflector. The light channel may also be oriented such that light from a plurality of light sources enters the incident surface of the light channel and is emitted from the emitting surface near the reflector. Moreover, a plurality of light channels may be included, with each light channel receiving light from one or more light sources and emitting light to one or more reflectors.

The light channel component 3 can be of different shapes and cross sections. For example, light channel components 3 may be in the shape of blade, with a wide cross section and sufficient thickness of material to allow light to transmit through the blade from an incident surface to an emitting surface. The front edge emitting surface 5 of the light channel component 3 may be textured to provide for an even distribution of emitted light.

Figure 2A:
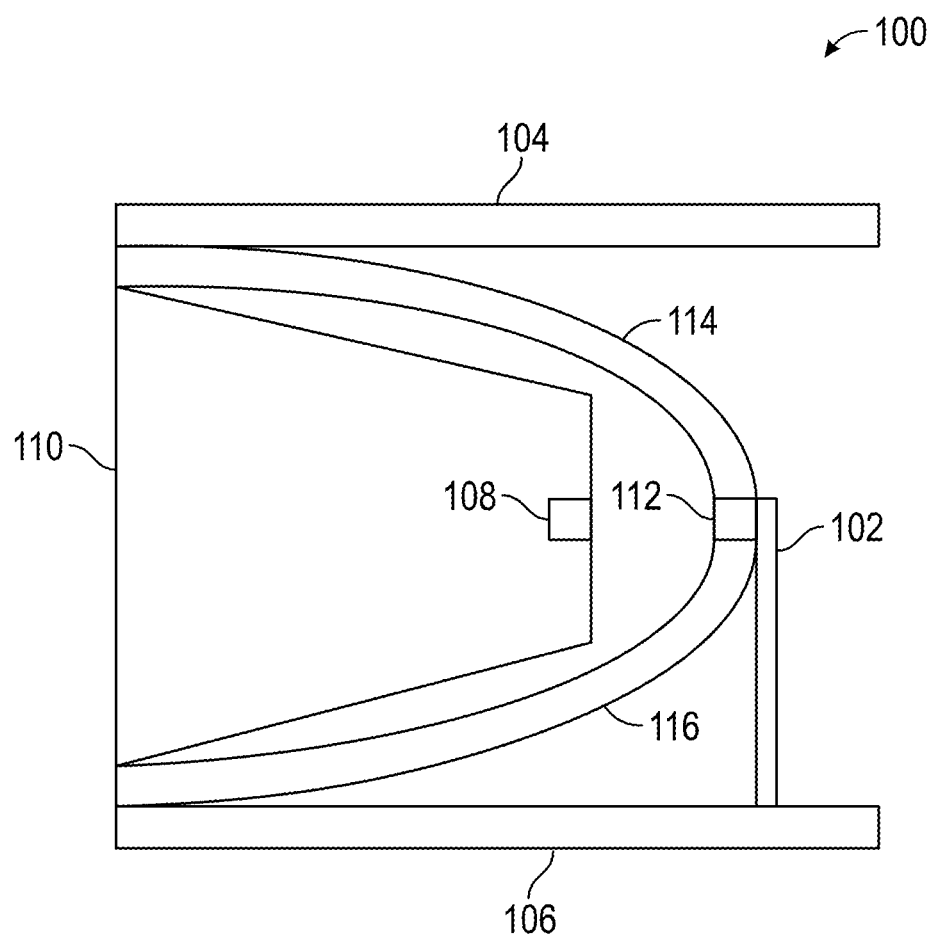
FIG. 2A is a cross-sectional view of a lightbar with peripheral lighting according to an embodiment of the present technology.

FIG. 2A illustrates a section of a lightbar or light module 100 implementing a light channel system as a peripheral lighting element. While discussed as a lightbar, the lighting system shown in FIG. 2A may also be implemented as a lighting module that could be incorporated into a lightbar, could operate as its own standalone lighting system, or could be used with other lighting modules. The lightbar 100 can include a peripheral LED mounting structure 102, top cover 104, and base 106 for supporting the internal elements of the lightbar. The peripheral LED mounting structure 102 may be formed of plastic, polycarbonate, or other rigid or flexible material. The mounting structure 102 may include one or more channels, openings, brackets, tabs, or supports to hold the peripheral LEDs, light channels, or both. The lightbar 100 can further include one or more LEDs 108, or other light sources, and reflective enclosure 110. The LEDs 108 and reflective enclosure 110 can form the primary lighting elements of the lightbar 100 for emergency signaling. The lightbar 100 can have a plurality of LEDs 108 and reflective enclosures 110 along the length of the lightbar 100. In particular, a lightbar can be formed with a plurality of lightheads, each of which is configured to generate light emission patterns which include varying colors and intensities of light. Each lighthead may be configured to combine the light generated by several light sources 108, which may be LEDs, into a broader beam for emission from the lightbar. Each lighthead may include light sources 108, which may be supported on a PC board or similar support, a heat sink, and one or more optical reflectors such as reflective enclosures 110.

The lightbar 100 can further include one or more a peripheral LEDs 112. When the lightbar is comprised of lightheads, each lighthead may have a peripheral LED 112 or only a select subset of the lightheads making the lightbar can include a peripheral LED. The peripheral LED 112 can be a single or group of LEDs capable of outputting light of a single color or multiple colors. The peripheral LED can be positioned behind LEDs 108 such that the peripheral LED 112 may not be directly visible due to the LEDs 108 and reflective enclosure 110 positioned in front of the peripheral LED 112. Alternatively, the peripheral LED can be located above or below the top cover or base. There may also be a plurality of peripheral LEDs either grouped together or provided at separate locations.

When the lighting channel system is implemented on a lightbar 100, the lightbar can include an upper light channel 114 and a lower light channel 116. The upper and lower light channels may have their emitting surfaces aligned with the upper and lower edges of the lightbar, respectively. Moreover, the lightbar can include light channels on the sides thereof, such that light channels extend around the entire periphery of the lightbar.

The peripheral LEDs 112 can transmit light through the upper and lower transmissive materials making up the upper and lower light channels 114 and 116. This can be used to generate light from the peripheral LEDs 112 both in the absence of the emergency light generation section including LED 108 and reflective enclosure 110 or in addition to the emergency light generation section. When used simultaneous with the LED 108, the peripheral LED 112 can be used to generate different colors as necessarily during emergency operations. In particular, a controller may be connected to both main emergency light generation LEDs such as LEDs 108, and to peripheral LEDs 112 that transmit light into the light channels. The controller may be a single controller, or a plurality of controllers in communication with each other.

The controller may be configured to coordinate the illumination of the main light source LEDs 108 and the light channel LEDs 112. The controller may control LEDs 108 and 112 to be the same colors or can control the LEDs 108 and 112 to emit different color light depending on the desired situation. For example, the LEDs 112 may be configured to emit one color light into the light channels, such that the top and bottom edges of the lightbar are illuminated with a distinguishing color. This can allow for different vehicles at a scene to be identified, depending on their role. For example, a main or lead vehicle could have the light channels emit a blue peripheral light, vehicles designated to form a perimeter could have light channels controlled to emit a red light, and vehicles designated for pursuit or personnel assistance could have light channels controlled to emit a green light. Other identifying colors and color combinations may also be used. In addition, the controller may be configured to maintain illumination of the peripheral LEDs 112, even as the LEDs 108 of the lightheads are controlled such that their illumination increases and decreases, or even turns on and off. The peripheral LEDs 112 can also be controlled such that their intensity increases, and they are on, when the lighthead LEDs 108 are turned off or are at their lowest illumination intensity in an illumination pattern. By controlling the peripheral LEDs in such a manner, the light from one or more emergency vehicles at a scene can be emitted in patterns so as not to be disorienting to drivers or pedestrians in the area. For example, the peripheral LEDs can be made to illuminate one or more light channels so that there is no on/off flashing of light from vehicles, but always at least some light emission.

Moreover, the LEDs 108 and peripheral LEDs 112 on one or more vehicles can be synchronized so that the light emission patterns are coordinated. One or more controllers may be associated with the driving circuitry for the different LEDs making up the lighting systems on the vehicles. These controllers may include wireless or wired communication interfaces allowing communication with a local or remote central controller or server. The controllers may further include global positioning system (GPS) receivers that can receive GPS signals include time stamp information. The controllers may receive commands from the central controller that indicate the pattern and timing for light emission from each LED in order to coordinate emergency light patterns for the lights on one or more vehicles. The controllers may also include processors with memory that comprise instructions for emitting different predetermined patterns, which can be implemented at selected starting times based on a signal from a local or remote controller or server, or based on the received GPS signal.

As noted, the peripheral LED 112 can be split into multiple peripheral LEDs. The multiple peripheral LEDs 112 can be split to provide light to either the upper light transmissive material 114 or the lower light transmissive material 116. The upper and lower peripheries can be configured to produce different colors and/or intensities of light through the associated peripheral LEDs with the upper and lower light transmissive materials.

Figure 2B:
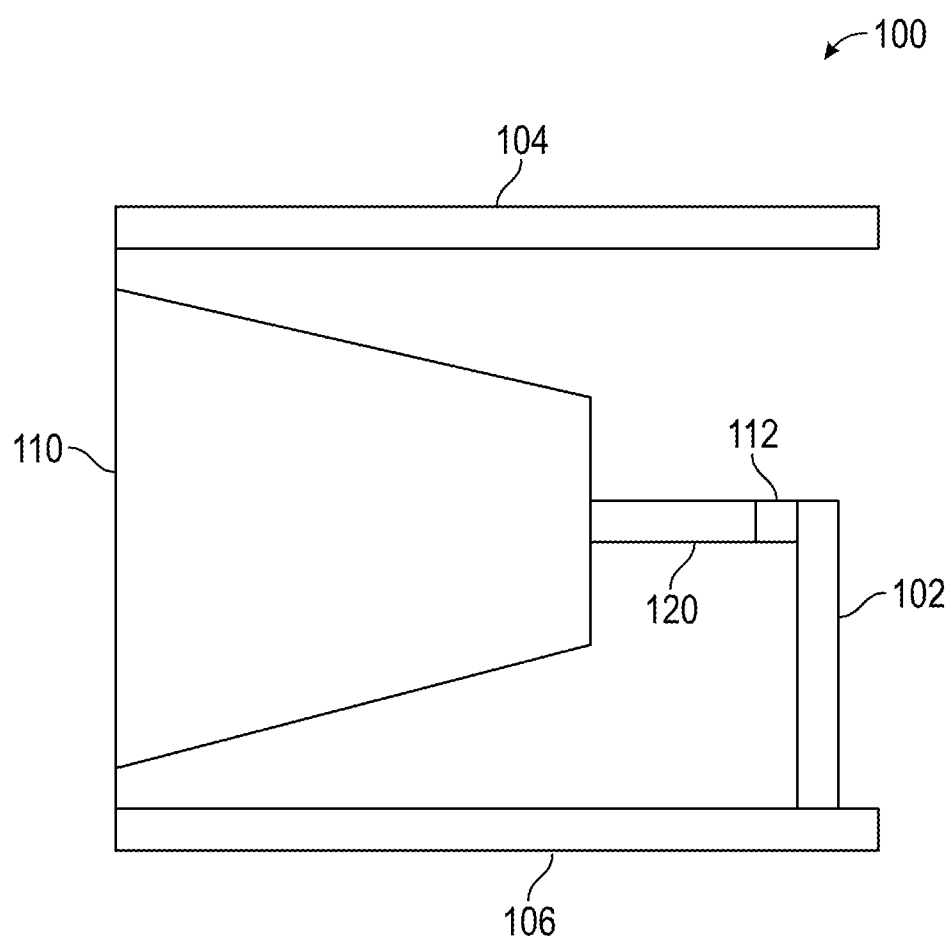
FIG. 2B is an illustration of a lighting channel system with an LED and lighting channel acting as a primary light source.

As illustrated in FIG. 2B, a lightbar or light module 100 may also include an internal LED 112 with a light transmissive material 120 configured as the primary light source. The lightbar or light module may include a cover 104 and a base 106. As shown, the LED 112 may be mounted on a mounting structure 102. A light transmissive material 120 may be positioned such that light from the LED is incident on an incident surface of the light transmissive material and exits from an emitting surface of the light transmissive material. The emitting surface of the light transmissive material 120 may be positioned within a reflective enclosure 110 such that light from the LED is transmitted through the light transmissive material and directed outward from the lightbar or light module 100, with some of the light being reflected off of reflective enclosure 110. As discussed above with respect to FIG. 2A, controllers may be used to control the light emitted from the LED, and may further control and coordinate light emitted from multiple LEDs and multiple lightbars or light modules including LEDs.

Figure 3A:
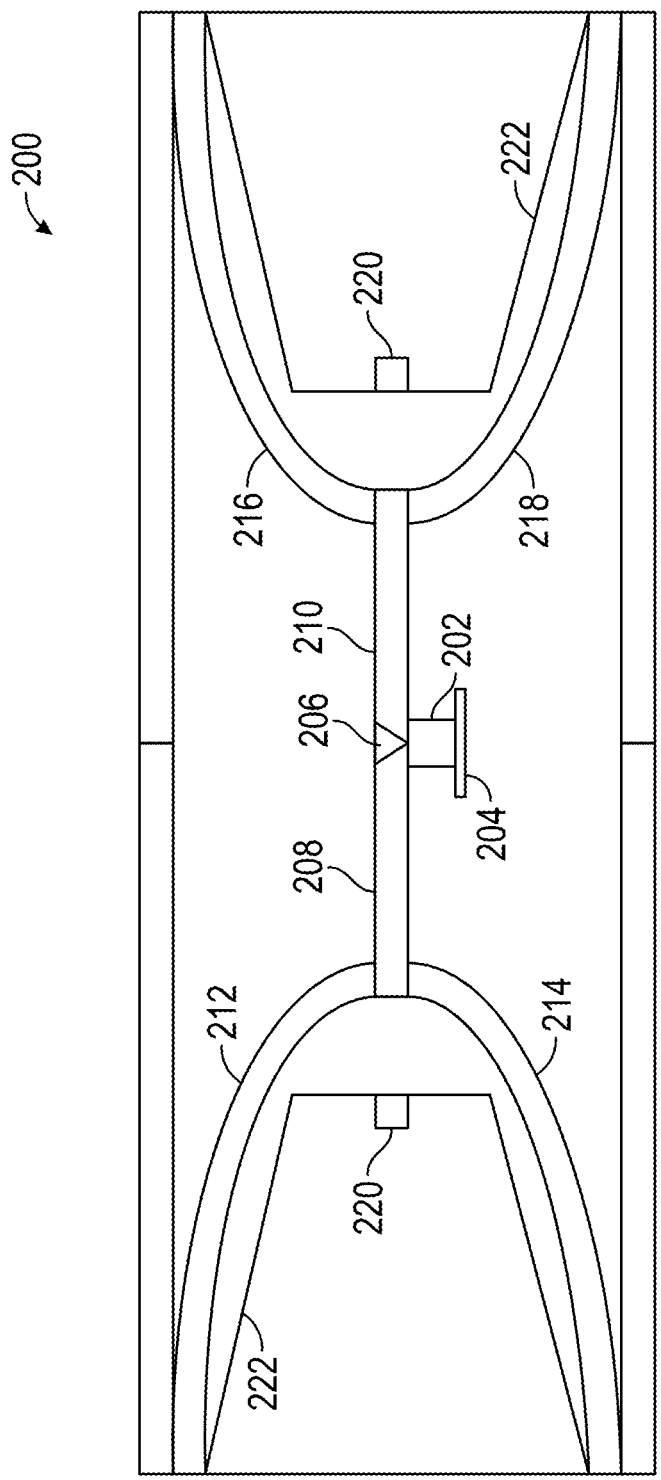
FIG. 3A is a cross-sectional view of an alternative lightbar with peripheral lighting according to an embodiment of the present technology.

FIG. 3A illustrates a lightbar 200 with peripheral lighting formed by light channels. As shown, an internal LED 202 can be provided in a printed circuit board (PCB) 204. The PCB 204 may be oriented in any direction, including at an angle. A light splitter 206 can be positioned above the internal LED 202. The light splitter 206 can have a reflective surface to reflect the light transmitted by the internal LED 202. The lightbar 200 can further include internal light transmissive material 208 and 210. Light from the internal LED 202 can be reflected off the light splitter 206 and through the internal light transmissive material 208 and 210. The surfaces of the internal light transmissive material 208 and 210 can be reflective to further aid in transmitting the light from the LED.

Light transmitted through the front light transmissive material 208 can further be transmitted through upper front light transmissive material 212 and lower front light transmissive material 214. Similarly, light transmitted through the back light transmissive material 210 can further be transmitted through upper back light transmissive material 216 and lower back light transmissive material 218. This setup can be used to provide light from a single LED arrangement to both an upper and lower periphery on both a front and back of a lightbar.

In an embodiment, the internal LED arrangement 202 can be split. In this arrangement, certain LEDs of the internal LED arrangement 202 can be provided with respect to the front light transmissive material 208, upper front light transmissive material 212, and lower front light transmissive material 214 and other LEDs of the internal LED arrangement 202 can be provided with respect to the back light transmissive material 210, upper back light transmissive material 216, and lower back light transmissive material 218. This can result in independent control over the front and back peripheral lights.

Further, the lightbar 200 can include LEDs 220, positioned inside reflective enclosures 222. These LEDs 220 can emit a primary light, which is reflected by reflective enclosure, to be emitted from the lightbar. The reflective enclosures described herein may include a metalized surface or an internal reflective surface of an optical solid.

Figure 3B:
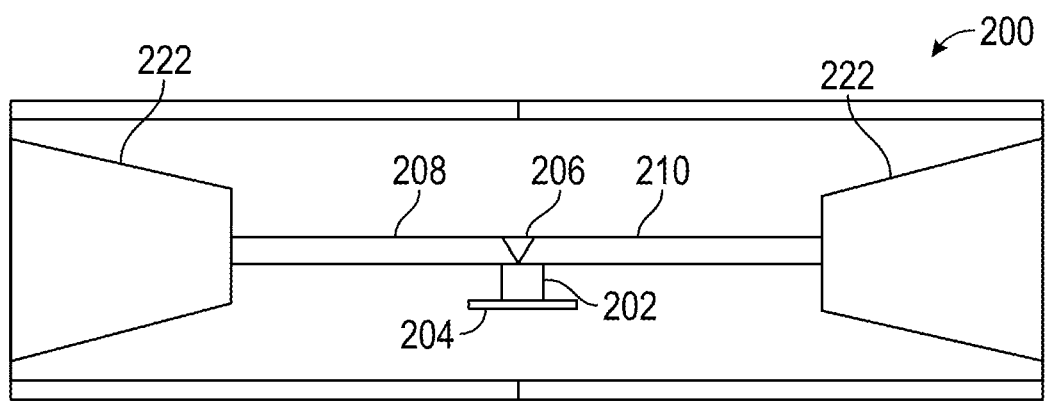
FIG. 3B is a cross-sectional view of a lightbar with an LED and lighting channels acting as primary light sources.

FIG. 3B illustrates a lightbar or module 200 with an internal LED 202 provided on a PCB 204. A light splitter 206 can be positioned above the internal LED 202. The light splitter 206 can have a reflective surface to reflect the light transmitted by the internal LED 202. The lightbar 200 can further include internal light transmissive material 208 and 210. Light from the internal LED 202 can be reflected off the light splitter 206 and through the internal light transmissive material 208 and 210. The surfaces of the internal light transmissive material 208 and 210 can be reflective to further aid in transmitting the light from the LED. As shown in FIG. 3B, the internal light transmissive material 208 and 210, which may be light channels, may terminate with an emitting surface inside of reflective enclosures 222. The light emitted from the light transmissive material 208 and 210 may be directed outwards from the lightbar, with some of the light reflected off of the reflective enclosure. Thus, the internal LEDs and light transmissive materials 208 and 210 may act as the primary light sources for the light bar or light module 200.

Figure 4:
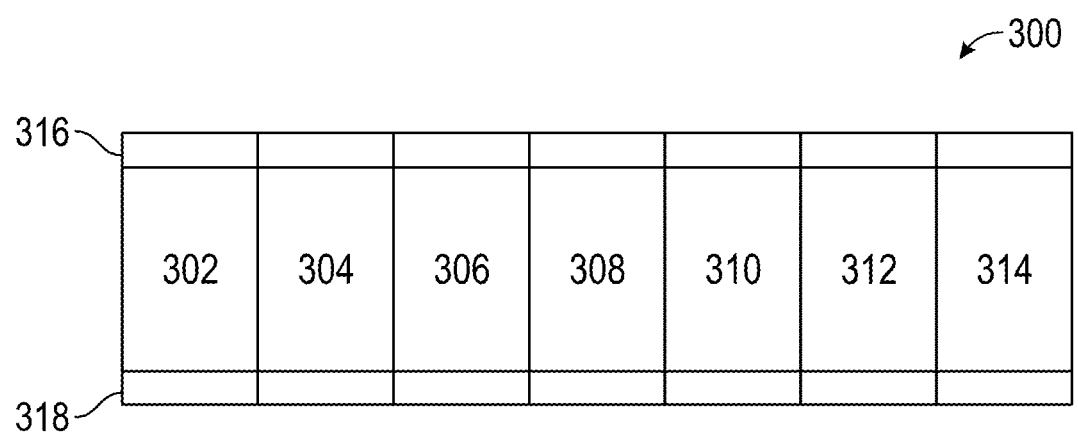
FIG. 4 is a front view of a lightbar with peripheral lighting according to an embodiment of the present technology.

FIG. 4 is a front-view of a lighting system in the form of a lightbar 300 made of a plurality of modules. Lightbar 300 can include a plurality of modules 302-314. Each module can include the LED and reflective enclosure comprising the primary emergency light generation system. Each module can further include upper light transmissive material 316 and lower light transmissive material 318. FIG. 4 illustrates how the upper and lower light transmissive materials can be used to display the light produced by peripheral LED on the periphery of the lightbar 300.

Figure 5:
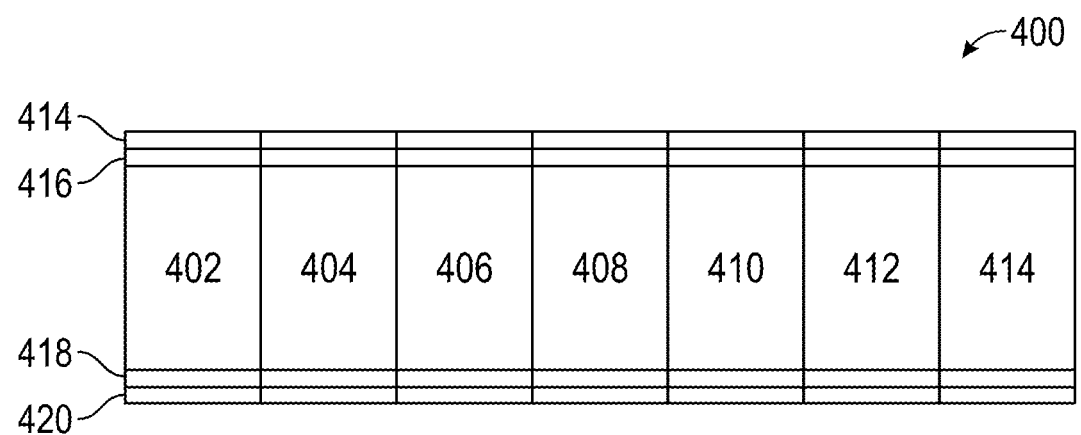
FIG. 5 is a front view of a lightbar with multiple peripheral lighting sections according to an embodiment of the present technology.

FIG. 5 is a front-view of a light bar with multiple periphery sections. Here, there can be an upper top periphery section 414, lower top periphery section 416, upper bottom periphery section 418 and lower bottom periphery section 420. Additional periphery sections can be added to both the upper periphery and lower periphery as desired. In certain embodiments, there can be no upper periphery sections or no lower periphery sections.

Figure 6:
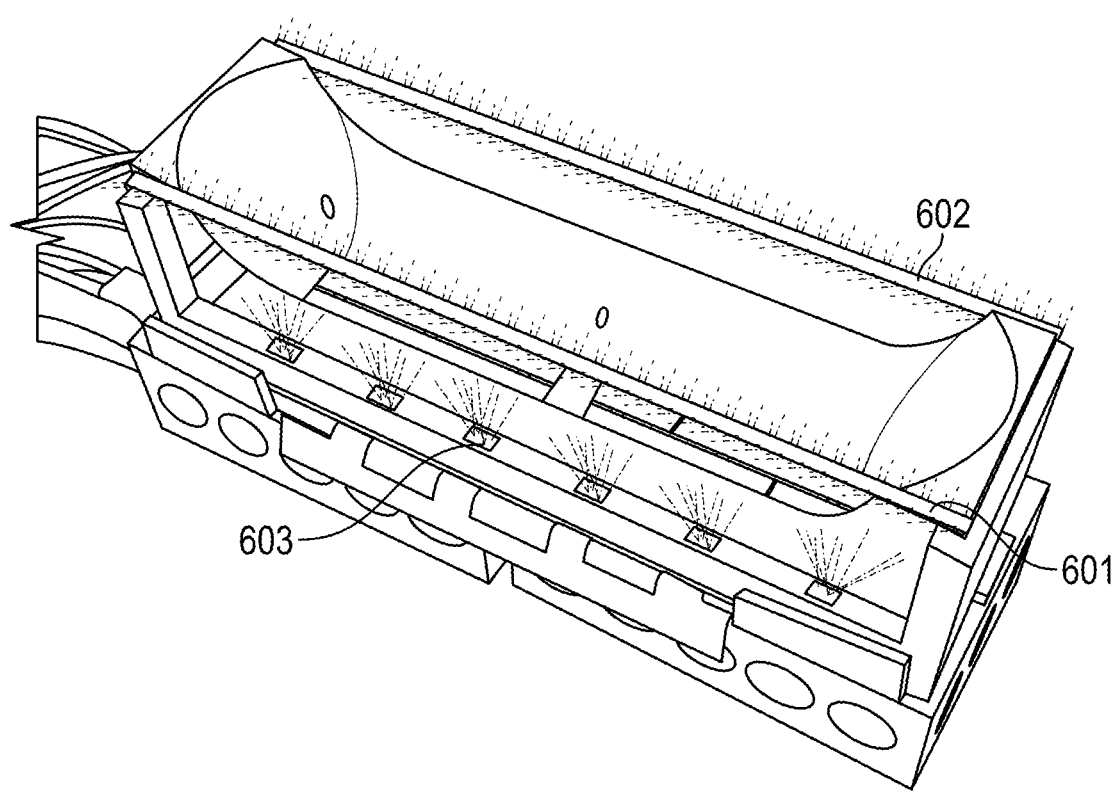
FIG. 6 is an illustration of a lighting module that includes upper and lower lighting channels.

FIG. 6 shows an example of a lighting module that includes upper and lower lighting channels. The upper and lower lighting channels 601, 602 transfer light from the light source 603 to emitting surfaces of the upper and lower light channels through total internal reflection. As shown, the light source may be a plurality of LEDs on a printed circuit board included in the base of a housing. The light channels may further be mounted to the housing, such that an incident surface of the light channel is in proximity to the LEDs to receive light from the LEDs. The light is then transmitted through the light channels to the emitting surfaces. Additional optics, such as reflective surfaces or lenses may be included in the lighting module.

Figure 7:
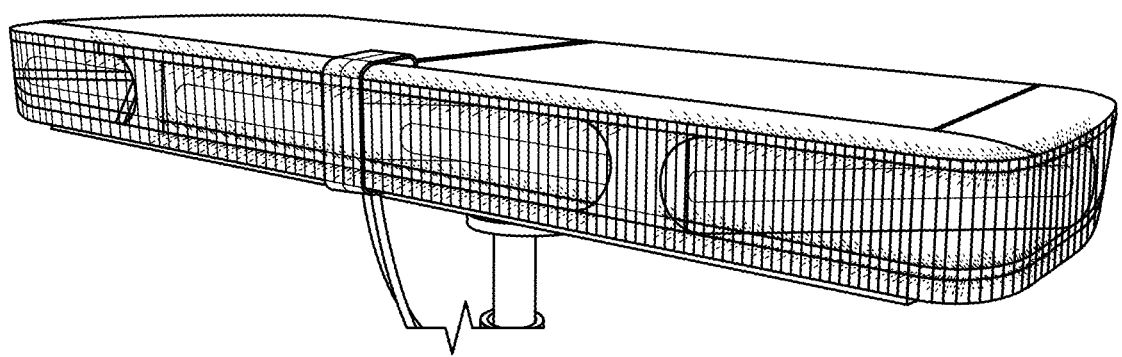
FIG. 7 is an illustration of a light bar comprising a plurality of lightheads, with each lighthead including an upper and lower lighting channel.

FIG. 7 shows an example of a light bar comprising a plurality of lightheads, with each lighthead including an upper and lower lighting channel. One or more light sources, such as LEDs, may be used to emit light into the light channels at an incident surface, wherein the light is then transmitted through the light channel to an emitting surface.

Figure 8:
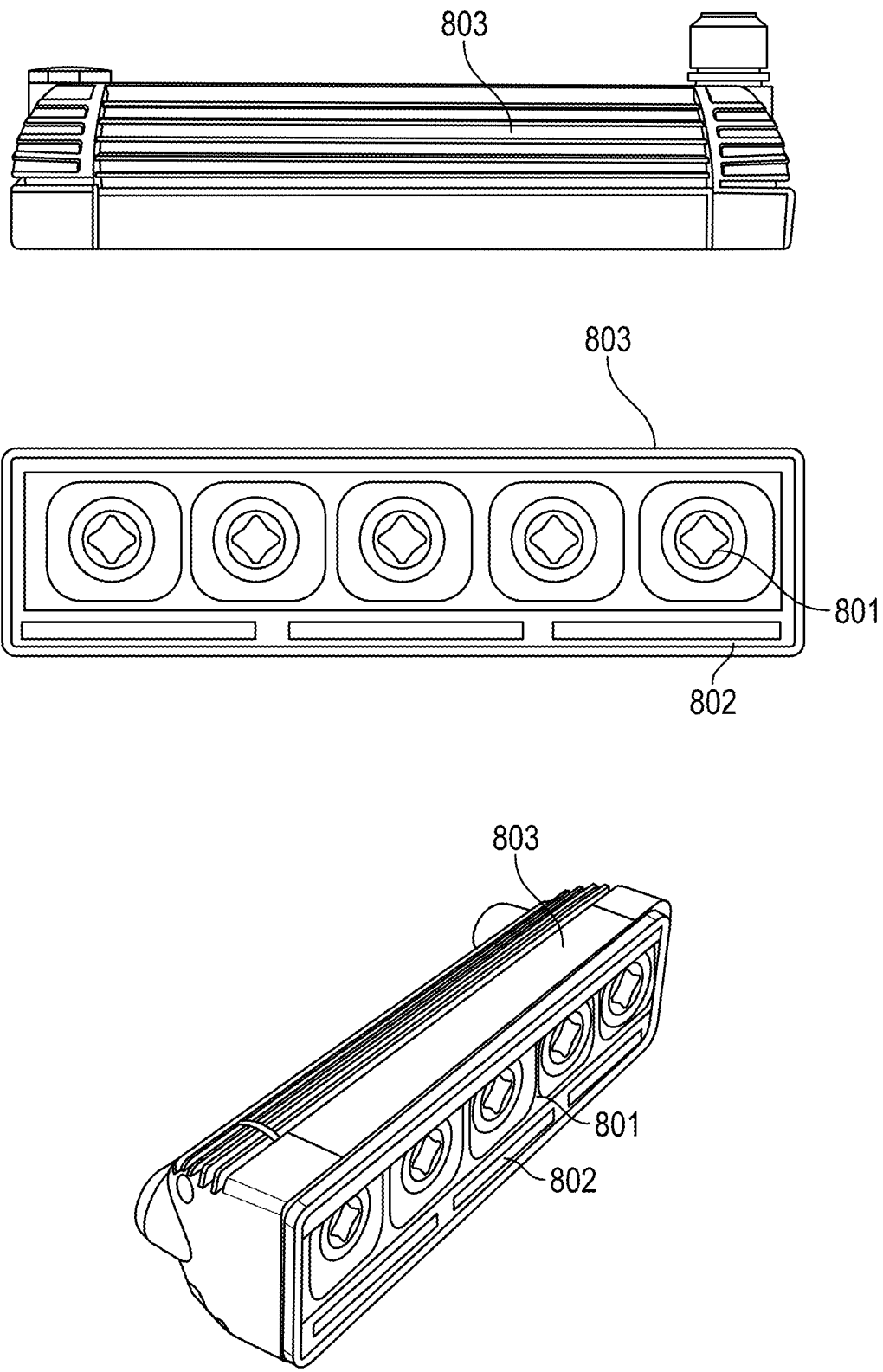
FIG. 8 is an illustration of a lighting module comprising a plurality of flood light elements, and a plurality of light channel elements.

FIG. 8 is an illustration of a lighting module comprising a plurality of flood light elements 801, and a plurality of light channel elements 802. The flood light elements comprise one or more light sources, such as LEDs, and a lens or other optical element may be included in front of the light sources. One or more additional light sources may be provided as the light source for the light channel elements. As noted, the emitting surface of the light channel elements 802 may be textured to provide even light output. As shown in the figure, the flood light elements and light channel elements may be included in a module having a housing 803 in which the flood light elements and light channel elements are mounted. The light channel elements 802 may be mounted internally in the housing 803, with openings in the housing corresponding to the dimensions of the emitting surface of the light channel elements 802.

Figure 9:
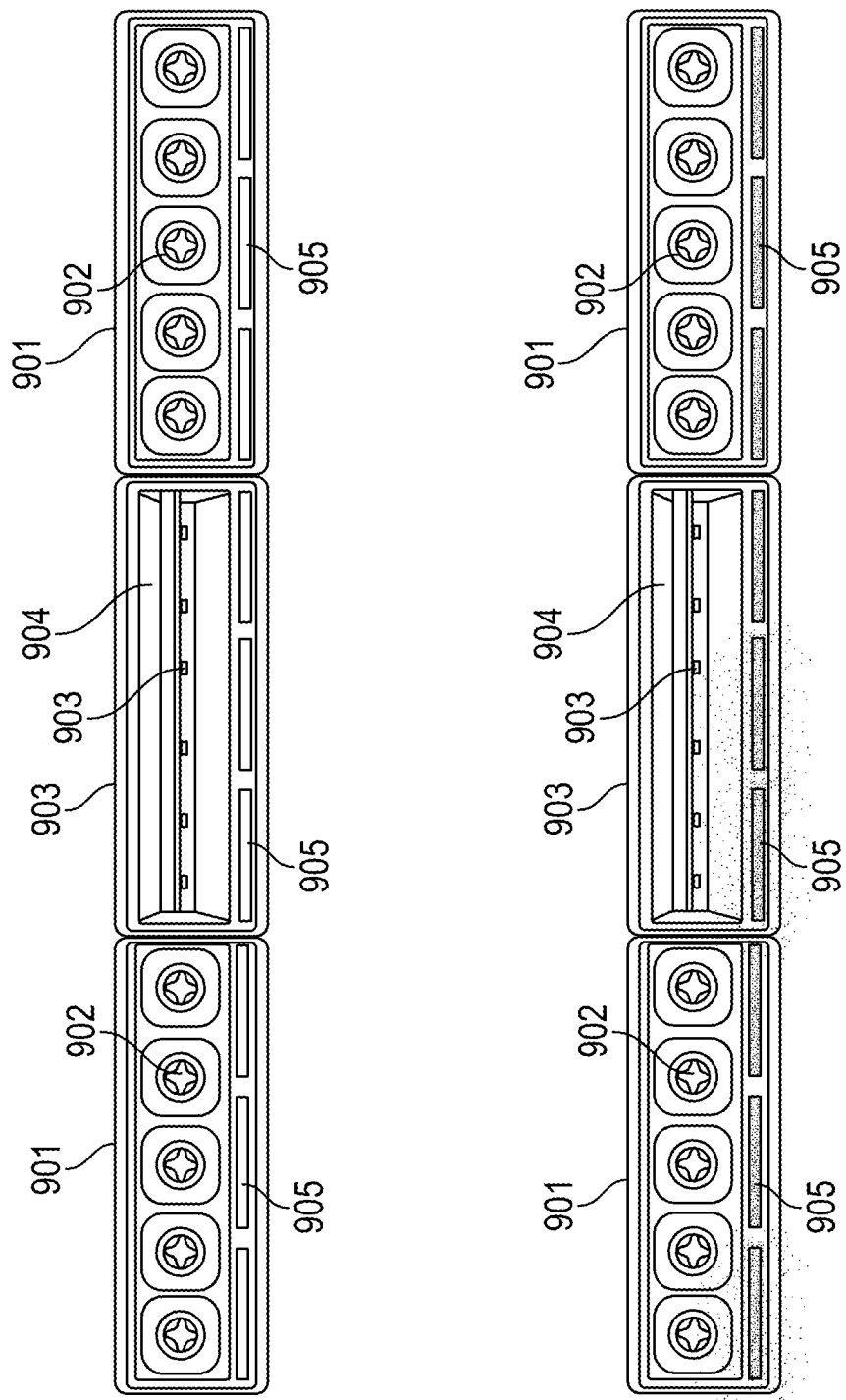
FIG. 9 illustrates a lighting system comprising a plurality of scene and flood light modules, with each module including a plurality of light channels.

FIG. 9 illustrates a lighting system comprising a plurality of scene light modules 903 and flood light modules 901, with each module including a plurality of light channels 906 acting as peripheral lighting elements. The top view in FIG. 9 illustrates the system without the peripheral lighting elements illuminated, and the bottom view illustrates the peripheral lighting elements being illuminated. The scene lights 903 may include a metalized reflector 904, or other reflective element, to transmit light in a particular direction. One or more light sources 905, such as LEDs, may direct light to the reflector 904, which then transmits the light in the desired direction to illuminate a particular area. The flood light modules 901 may include a plurality of flood or spot lighting elements 902, such as LEDs, and optics to produce light emitted in a particular direction. As shown in FIG. 9, the lighting system may be formed from a plurality of modules. Each module may include one or more scene lights only, one or more flood lights only, one or more peripheral lighting elements only. Each module may also include combinations of lighting elements, such as one or more flood lights and one or more peripheral lighting elements, or one or more scene lights and one or more peripheral lighting elements. For example, as shown in FIG. 9, a system can comprise three modules, with two modules having flood light elements 902 and peripheral lighting elements 906 and a middle module having scene lighting elements 905 and peripheral lighting elements 906.

Figure 10A:
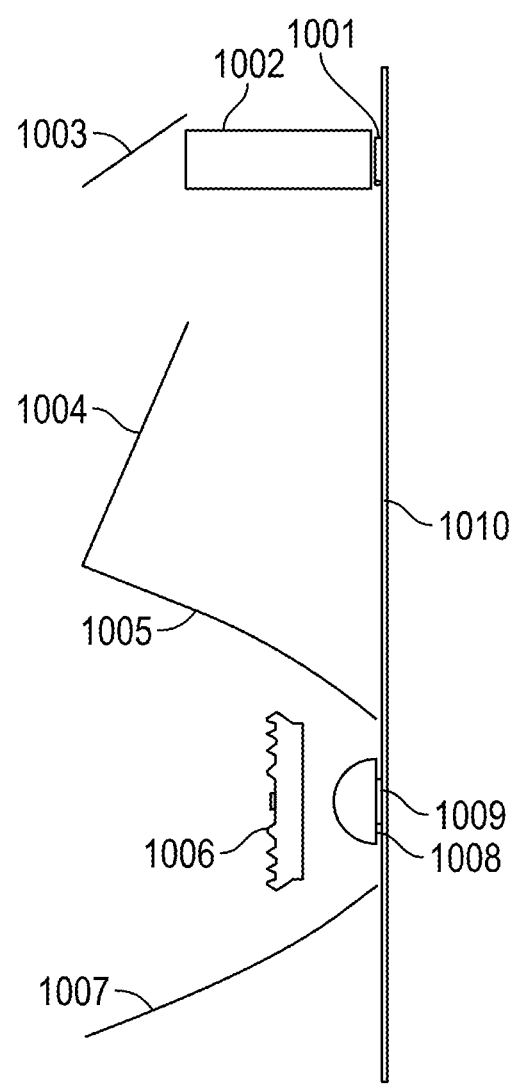
FIG. 10A is a schematic representation of an embodiment of an illumination module comprising scene or flood lights and forward illumination lights.
Figure 10B:
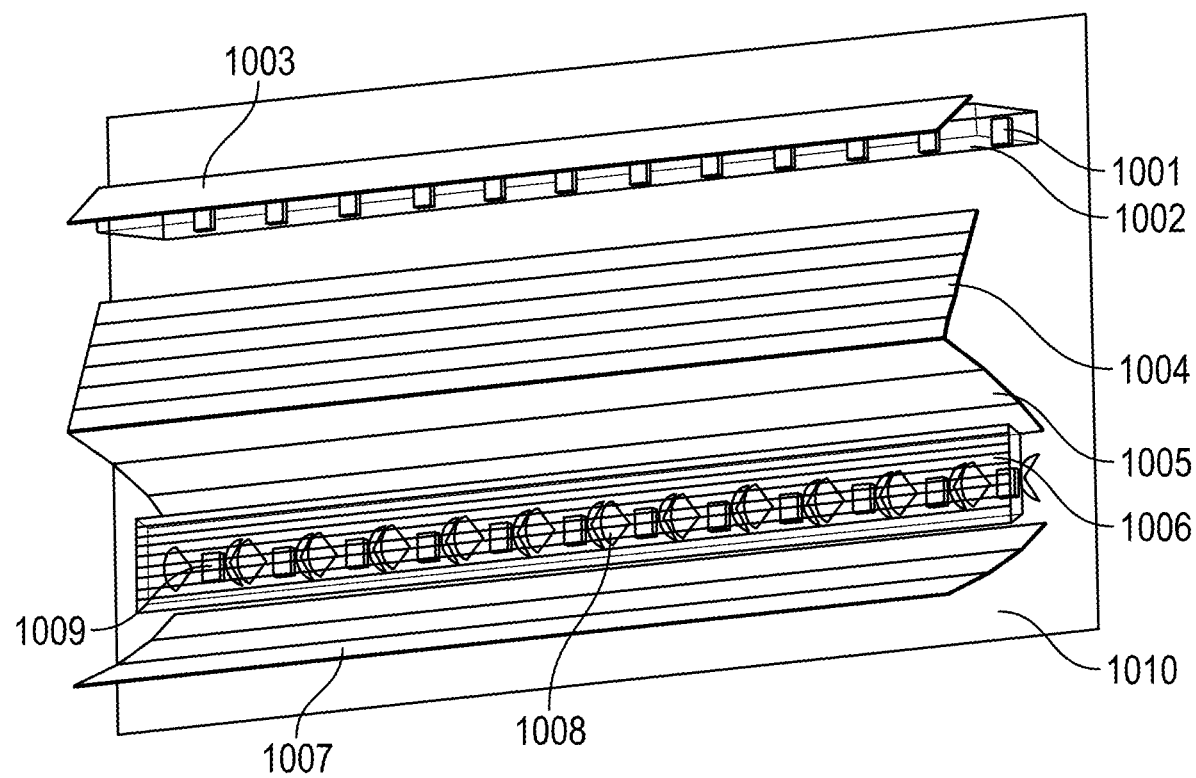
FIG. 10B is perspective view of the illumination module shown in FIG. 10A.

FIGS. 10A and 10B illustrate an embodiment of a lighting module including near field, flood/scene lights and forward illumination lights. FIG. 10A illustrates a side view of the lighting module, and FIG. 10B illustrates a perspective view. As shown in FIG. 10A, the lighting module may include a first light source 1001, such as an LED, for providing near field light, or flood/scene light, in the vicinity of the lighting module. The light source 1001 may be included on board 1010, such as a printed circuit board. A lighting channel 1002 may be included such that light from light source 1001 enters the lighting channel at an incident face thereof, and is emitted from the lighting channel at an emitting face. The lighting channel may comprise light transmissive material as described herein, that can transmit light using total internal reflection. The emitting face may be located at the focal points of top flood reflector 1003 and bottom flood reflector 1004, such that light from the LED is brought to the focal points of top reflector 103 and bottom flood reflector 1004. by the lighting channel. That is, while the light source 1001 is not located at the focal point of top flood reflector 1003 or bottom flood reflector 1004, by positioning the lighting channel 1002 between the light source and reflectors, the light from the light source is brought to the focal points through the lighting channel. Top flood reflector 1003 directs the light from the emitting face of lighting channel 1002 downwards into the near field, flood/scene area around the lighting module. Bottom flood reflector 1004 spreads light from light source 1001, emitted from the emitting face of light channel 1002, at an angle such that the light is spread. For example, when the lighting module is mounted on a vehicle, the bottom flood reflector 1004 may spread the light at angle of from about 5 degrees below horizon to about 60 degrees to smooth out the ground lighting around the vehicle.

The lighting module shown in FIGS. 10A and 10B may further include a forward illumination light source 1009, such as an LED. Forward illumination light source 1009 may be mounted to the same board 1010 as light source 1001. Alternatively, light sources 1009 and 1001 may each be mounted to their own, separate board. The forward illumination light source 1009 may be used to illuminate areas or objects away from the lighting module, including far field areas and objects at a greater distance away than the light from light source 1001 can illuminate. The forward illumination light source 1009 may operate in coordination with other components to provide the far field or forward illumination. For example, the lighting module includes top forward illumination reflector 1005, collimator 1006, bottom forward illumination reflector 1007, and diamond optical reflectors 1008. The diamond optical reflectors 1008 reduces light source 1009's overall left and right spread, focusing the light forward. Top forward illumination reflector 1005 and bottom forward illumination reflector 1007 redirect Lambertian light output from light source 1009 to collimate the light output. Collimator 1006 captures remaining light from the light source 1009 that is not captured by reflectors 1005 and 1007, and collimates the light source's Lambertian pattern output to direct the light forward. coupled to the collimator 214 and the diamond optical reflector 218.

As shown in FIG. 10B, a plurality of lights sources 1001 and 1009 may be included, along with a plurality of diamond optical reflectors 1008 located between the lights sources 1009. The diamond optical reflectors may be arranged laterally with respect to the far field lights sources 1009 in order to capture light from the left and right sides. The diamond optical reflectors 218 may be particularly selected and positioned based on a desired angle of capture with respect with the second light sources 1009 (e.g., approximately 120 degrees, approximately 140 degrees, etc.). The diamond optical reflectors 1008 may be substantially conically shaped, with a "tip" of the conical shape facing a light source 1009. As light is emitted from a light source 1009, the light may be directed toward the sides (e.g., laterally out) and may be captured by the diamond optical reflectors 1008 and then directed toward at least one of the top forward illumination reflector 1005, the collimator 1006, and/or the bottom forward illumination reflector 1007. The remaining light emitted from the light source 1009 may be reflected by top and bottom forward illumination reflectors 1005, 1007 and/or output through the collimator 1006. Accordingly, systems and methods of the present disclosure may use the forward illumination section of the lighting module for far field illumination, which may be between approximately 10 yards and 20 yards away from the lighting module.

Thus, the lighting module shown in FIGS. 10A and 10B includes two different light source sections as discussed above. One light source section provide near field, or scene, illumination with light from light sources 1001, and the other provides forward, or far field, illumination with light from light sources 1009. Using lighting channel 1002 to bring light from the light sources 1001 to the focal point of the reflectors allows for light sources 1001 and 1009 to be mounted on a common board, such as PCB 1010. This provides for a common board 1010 to be used for both sets of light sources, and gives more room on the board for larger components. Moreover, the light sources may be LEDs and may be controlled with a controller, such as described with respect to FIGS. 1A and 1B. The controller may control the light output from the individual light sources 1001 and 1009, and may vary the output of light from each. The controller may control lighting patterns by changing the light output from each of the light sources.

The lighting channels described herein, implemented as peripheral lighting, can be used in a number of exemplary functions. In one example, the peripheral lighting can be used as uniform cruise lighting during non-emergency situations. Here, the peripheral lighting can be turned on to alert others nearby of the presence of an emergency vehicle without the use of the primary emergency lights. This can be used to help identify emergency vehicles in low visibility situations without using the primary lights generally associated with emergencies. For example, the peripheral lighting can be turned on to one or more desired colors when an emergency vehicle is not in an emergency response mode. This can allow the emergency vehicle to be identified by drivers and pedestrians in the area without distracting flashing of light. The peripheral lighting can also be used for clearance identification lights. For example, the peripheral lighting can be configured at particular distances and produce predetermined beam patterns such that the lights identify a clearance level or the outer edges of a vehicle body to which they are attached. For example, the peripheral lighting elements may be mounted on the upper edges or upper corners of a vehicle, and may be oriented to produce light at particular angles, such as 90 degrees or 45 degrees, from the vehicle.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A lighting module, comprising:
   a housing;
   a printed circuit board mounted within the housing;
   a first section comprising:
      at least one first light source mounted on the printed circuit board;
      a light transmissive material of a light channel having an incident face and an emitting face, the incident face being positioned such that light from the at least one first light source enters the incident face and is emitted from the emitting face;
      a first reflector; and
      a second reflector;
   wherein the light transmissive material of the light channel is positioned such that the emitting face is located at the focal point of at least one of the first reflector or the second reflector;
   a second section comprising:
      at least one second light source mounted on the printed circuit board;
      a third reflector;
      a fourth reflector; and
      two or more diamond optical reflectors having a substantially conical shape.

2. The lighting module of claim 1, wherein a first diamond optical reflector of the two or more diamond optical reflectors is positioned at a first lateral side of at least one second light source and a second diamond optical reflector of the two or more diamond optical reflectors is positioned at a second lateral side of the at least one second light source.

3. The lighting module of claim 1, wherein a diamond optical reflector is positioned on either lateral side of each of the at least one second light sources.

4. The lighting module of claim 1, wherein each of the at least one first light sources and the at least one second light sources is a light emitting diode (LED).

5. The lighting module of claim 1, further comprising:
   a controller in communication with each of the first and second light sources, the controller configured to control the light output of each of the first and second light sources.

6. The lighting module of claim 1, wherein a tip of the substantially conical shape of each of the two or more diamond optical reflector faces towards at least one second light source.

7. The lighting module of claim 1, wherein the at least one second light source comprises a plurality of second light sources, and wherein the two or more diamond optical reflectors are arranged laterally with respect to the plurality of second light sources.

8. The lighting module of claim 7, wherein the plurality of second light sources are configured to emit light, with at least some of the emitted light being directed forward, and at least some of the emitted light being directed towards the third reflector and the fourth reflector, and at least some of the emitted light being directed laterally outward towards the sides of the at least one second light source.

9. The lighting module of claim 8, further comprising a collimator.

10. The lighting module of claim 9, wherein the third reflector is positioned substantially above the plurality of second light sources and the fourth reflector is positioned substantially below the plurality of second light sources.

11. The lighting module of claim 10, wherein a first diamond optical reflector of the two or more diamond optical reflectors is positioned laterally on either side of each of the plurality of second light sources, and wherein the two or more diamond optical reflectors are configured to direct light emitted laterally outward from the plurality of second light sources toward at least one of the third reflector, the fourth reflector, or the collimator.

12. The lighting module of claim 1, wherein the third reflector is positioned substantially above the at least one second light source and the fourth reflector is positioned substantially below the at least one second light source.

* * * * *